United States Patent [19]
Beckman

[11] Patent Number: 5,886,061
[45] Date of Patent: *Mar. 23, 1999

[54] POLYMERS CAPABLE OF REVERSIBLY COMPLEXING ACID GASES AND FOAMED POLYMERS PRODUCED THEREFROM

[75] Inventor: Eric J. Beckman, Edgewood, Pa.

[73] Assignee: University of Pittsburgh, Pittsburgh, Pa.

[*] Notice: The term of this patent shall not extend beyond the expiration date of Pat. No. 5,507,848.

[21] Appl. No.: 28,372

[22] Filed: Mar. 9, 1993

[51] Int. Cl.$^6$ .................................................. C08F 14/00
[52] U.S. Cl. .............................. 521/147; 121/58; 121/97; 121/139; 121/146; 264/50; 264/53; 525/332.2; 55/522; 55/524
[58] Field of Search .............................. 521/147, 58, 97, 521/139, 146; 264/50, 53; 525/332.2; 55/522, 524

[56] References Cited

U.S. PATENT DOCUMENTS

| 4,735,970 | 4/1988 | Sommerfeld et al. | 521/128 |
| 4,911,869 | 3/1990 | Meyer et al. | 264/50 |
| 4,925,606 | 5/1990 | Francis et al. | 264/50 |
| 5,380,767 | 1/1995 | Suh et al. | 521/79 |
| 5,507,848 | 4/1996 | Beckman | 55/522 |

FOREIGN PATENT DOCUMENTS

| A 0 066 944 | 12/1982 | European Pat. Off. . |
| A 2 024 442 | 8/1970 | France . |

*Primary Examiner*—Duc Truong
*Attorney, Agent, or Firm*—Reed Smith Shaw & McClay

[57] ABSTRACT

Polymers capable of reversibly complexing carbon dioxide and other acid gases and a method of producing such polymers are disclosed. In a preferred embodiment, the present polymers incorporate amine groups capable of reversibly complexing carbon dioxide to produce an environmentally safe foamed polymer product. Because the reaction of an amine and $CO_2$ is a reversible reaction, and because the amines are incorporated into the polymer backbone, the foamed polymers can be reverted to foamable polymers simply by collection, washing, granulating, and re-exposure to $CO_2$. The polymers are environmentally desirable as carbon dioxide is non-toxic and is easily isolated from the atmosphere. Moreover, the process recycles the gas continually, rather than generating new gases.

60 Claims, 18 Drawing Sheets

OR

POLYMERS CAPABLE OF REVERSIBLY COMPLEXING ACID GASES AND FOAMED POLYMERS PRODUCED THEREFROM

FIELD OF THE INVENTION

The present invention is related to polymers capable of reversibly complexing carbon dioxide and acid gases and to a method of producing such polymers, and especially to environmentally preferred, foamable aminated polymers that are capable of reversibly complexing carbon dioxide to produce a foamed polymer product.

BACKGROUND OF THE INVENTION

A significant portion of the domestic foamed polystyrene industry is threatened by environmental problems associated with production and use of expanded, or foamed polystyrene. Foamed (also known as "expanded" or "cellular") polystyrene is produced via physical blending of "blowing agents with the polymer matrix, followed by heat treatment to initiate foaming. Blowing agents can be sub-divided into two general classes: (1) small molecules which thermally decompose to a gas (predominantly nitrogen) which initiates foaming, plus other volatile fragments; and (2) volatile liquids which are absorbed into the polymer, and which subsequently foam the polymer upon heating simply via vaporization. Examples of the first class of blowing agents include azo compounds (nitrogen producing) and calcium carbonate ($CO_2$-producing). Examples of the second type of blowing agent include Freons, pentane, air, nitrogen, and carbon dioxide.

The cells formed in the polymer during foaming remain filled with vapor characteristic of the blowing agent used. Given the large volume of foam produced each year, diffusion of vapor into the atmosphere during the foamed product's lifetime can cause significant environmental problems. Further, refoaming of recycled foamed polystyrene entails production and use of additional blowing agent which is both expensive and increasingly environmentally unacceptable.

Conventional foamed thermoplastics are produced via two distinct processes. In the first process, blowing agent is added either just prior to, or during extrusion of the polymer. High pressure within the extruder maintains a homogeneous mixture of blowing agent gas and polymer. Foaming commences with the reduction of pressure upon the polymer exiting the extruder. In the second process, blowing agent is added to polymer beads, which are then stored and shipped to a molder. Upon heating in a mold, the beads expand because of the action of the blowing agent, producing a molded, foamed article such as the drinking cups and trays used in many food-service applications.

Until recently, the preferred blowing agent for use in polystyrene beads was a Freon (chlorofluorocarbon) material or mixture. Freons were preferred because of their low toxicities, low flammabilities, and low boiling points. However, the publicity surrounding the effect of Freons on the atmospheric ozone layer, followed swiftly by the Montreal protocols, prompted the plastic industry to replace Freons in expanded polystyrene by a volatile alkane, usually pentane. Because pentane is not a "natural" material (it is refined from petroleum) and is also a "greenhouse gas", concern has arisen over the climactic effects of significant amounts of pentane released into the atmosphere as a result of foamed polystyrene production. The plastics industry has thus been searching for environmentally acceptable replacements for pentane in foamed polystyrene.

From an environmental perspective, $CO_2$ is unquestionably an attractive thermoplastic blowing agent in that it can be readily recovered from the atmosphere, it is non-flammable, and it exhibits relatively low toxicity. Indeed, experience has shown that carbon dioxide can produce a cellular morphology when used as a blowing agent for polystyrene. U.S. Pat. No. 4,925,606, German Patent No. 3,829,630, U.S. Pat. No. 4,911,869, Japanese Patent No. 63,000,330, Zwolinski, L. M., Dwyer, F. J., 42 Plast. Eng. 45 (1986) and French Patent No. 2,563,836 discuss the use of carbon dioxide as a blowing agent in extruded polystyrene foam.

As indicated by Wissinger, R. G. and Paulaitis, M. E., 25 J. Polym. Sci.: Part B: Polym. Phys. 2497 (1987) polystyrene will indeed absorb significant amounts of $CO_2$ under pressure. Because of the relatively low solubility of $CO_2$ in polystyrene and its high volatility, however, most of the gas rapidly effuses from the polymer matrix upon reduction of the pressure. This rapid effusion prevents formation of a commercially acceptable foam. Commercial producers of extruded polystyrene foam, therefore, use either Freon, pentane or a mixture of Freon or pentane and $CO_2$ as a blowing agent.

Moreover, despite the limited success of $CO_2$ in extruded foam, either alone or in a mixture, the use of $CO_2$ in foamed polystyrene beads is not presently possible. Quite clearly, unlike pentane and freon, the equilibrium concentration of $CO_2$ in polystyrene at atmospheric pressure is too low to support subsequent foaming of polystyrene beads or secondary foaming of slabstock during thermoforming.

In an art unrelated to foamable polymers, it is known that low molecular weight primary and secondary amines will react with $CO_2$ to form carbamic "zwitterions," providing the amines are sufficiently basic in character. These reactions have been discussed by Javier, F. J. B. G., Ing. Quim. 317 (October 1989); Javier, F. J. B. G., Ing. Quim., 215 (November 1989); Danckwerts, P. V., Sharms, M. M., 10 Chem. Eng. 244 (1966); Laddha, S. S., Dankwerts, P. V. 37 Chem. Eng. Sci. 475 (1982); Versteeg, G. F., an Swaaij, W. P. M., 43 Chem. Eng. Sci. 573 (1988) and Danckwerts, P. V., 34 Chem Eng. Sci 443 (1979). It is also known that these zwitterions are stable at ambient conditions but will revert to carbon dioxide and free amine at higher temperatures. U.S. Pat. No. 3, 029,227; U.S. Pat. No. 3,423,345; U.S. Pat. No. 4,102,801. $CO_2$/amine reactions have previously been used to construct thermally reversible protecting groups for reactive epoxy systems and to selectively remove carbon dioxide and acid gases from gas streams.

General public awareness concerning the protection of our environment has also created the need to devise environmentally friendly and energy-efficient technology for the clean-up of industrial gas streams. Weakly acidic gases such as $CO_2$, $SO_2$, $NO_x$ and $N_2S$ discharged directly into the atmosphere have been suggested to contribute to the formation of acid rain and so-called greenhouse warming. In addition, acidic gases such as $CO_2$, $SO_2$ etc. can act as poisons for various catalyst systems and thus must be removed from certain process streams. Traditional methods for acid gas removal include:

1. Aqueous solutions of amines/alkanolamines for scrubbing $CO_2$. The main disadvantages of these sorbent systems are: Slow reaction rates, energy intensive regeneration step (must heat large volumes of water), side reactions which degrade the amines, and loss of amines by evaporation.

2. Limestone for the removal of $SO_2$; the major environmental drawback associated with this process is the generation of large quantities of sludge.

3. High temperature mineral sorbents for the removal of $SO_2$ and NO. These materials are however not designed to also remove $CO_2$ selectively.

It is an object of this invention to provide environmentally safe, foamed polymers and especially to provide a polymeric matrix incorporating pendant amine groups capable of reversibly complexing $CO_2$, thereby providing an environmentally safe method of producing an expanded or foamed polymer.

Polymeric matrices incorporating amine groups are also useful as sorbents for acid gases.

SUMMARY OF THE INVENTION

Accordingly, the present invention provides polymers capable of reversibly complexing carbon dioxide and other acid gases including $SO_2$, $H_2S$ and $NO_x$.

In a preferred embodiment, an expandable (foamable) thermoplastic material is provided that is inherently recyclable and emits no pentane, freon or other environmentally hazardous gas to the atmosphere, either during or after the foaming process. The present invention also provides a method of producing such a thermoplastic material.

It has been discovered that the ability of amines to complex or react with carbon dioxide is substantially unaffected by incorporation of such amines into a polymeric matrix. Indeed, the thermal stability of amine-$CO_2$ adducts appears to increase upon incorporation of the amine into the polymer matrix. For example, tertiary amine-functional polymers bind $CO_2$ whereas a low molecular weight tertiary amine does not.

Generally, the aminated or amine-functional polymers react with $CO_2$ to form carbamic zwitterions (equation 1 below) and/or ion/counterion pairs (equation 2 below) of the following general formulae:

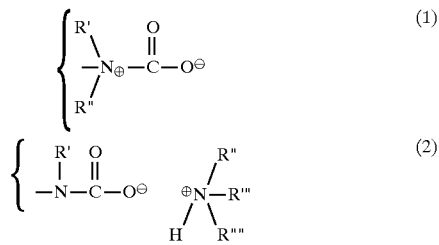

Wherein the polymer to which the amine functional group is attached preferably has an average molecular weight greater than approximately 25,000 and R', R", R'" and R"" are any alkyl or aromatic functional group. Preferably R' also comprise an amino group capable of complexing with $CO_2$ to form a carbimic zwitterion and/or a ion/counterion pair.

Aminated polymers with softening or glass transition temperatures ($T_g$'s) in a range coinciding with the range of temperatures over which $CO_2$ reaction products thermally dissociate will form a foamed polymer via thermal dissociation of the $CO_2$. Upon heating the material above a predetermined temperature, the polymer softens and the zwitterions and or ion/counterion pairs revert to "free" amine and $CO_2$, thereby inducing foaming.

Thus, polymers containing amine groups (preferably pendant primary or secondary amine groups) are first synthesized. Any amine group capable of reversibly complexing carbon dioxide can be used. Preferably the amine groups have a $pK_a$ greater than approximately 8.0. The pendant amine groups are preferably di- or triamines. Suitable amine groups include but are not limited to piperazine (PIP), 1-methylpiperazine (1-MPIP), cis and trans 1,4-diaminocyclohexane (1,4-DAC), diethylenetriamine (DETA), TETA, hexamethylene diamine, ethylenediamine (EDA), N-MEDA, N,N-DMEDA, N,N'-DMEDA, N,N,N'-TMEDA, diamine-p-menthane adamantanediamine, N,N'-diethyl-2-butene-1,4-diamine, N-cyclohexyl-1,3-propanediamine, and 3,3'-diamino-N-methyldipropylamine. Most preferably, the pendant amine groups are diamines.

Any polymer comprising pendant amine groups which can be thermally softened and foamed is suitable in that $CO_2$ binding or complexing is accomplished by the pendant amine groups. The polymer backbone functions to anchor the $CO_2$ complexing pendant amine groups and does not hinder the complexing or binding and subsequent debonding of $CO_2$.

To provide polymers with appropriate physical properties and $T_g$'s, the polymers preferably have a weight average molecular weight ($M_w$) above approximately 25,000. Preferably $M_w$ is in the range of approximately 25,000 to 1,000,000. More preferably, the polymers have a weight average molecular weight in the range of approximately 75,000 to 1,000,000. Most preferably $M_w$ is in the range of approximately 100,000 to 1,000,000.

The present aminated polymers preferably comprise sufficient amine groups to complex sufficient carbon dioxide to effect a desired degree of foaming. Preferably, the polymers comprise sufficient amine group to complex between approximately 1–33 weight percent carbon dioxide based upon the weight of the uncomplexed aminated polymer. More preferably the polymers comprise sufficient amine groups to complex between approximately 4–20 weight percent carbon dioxide. Most preferably the polymers comprise sufficient amine groups to complex between approximately 5–20 weight percent carbon dioxide.

Preferably, a thermoplastic material is produced by the copolymerization of vinyl monomers which can react with carbon dioxide to form carbamic zwitterions and/or ion/counterion pairs. More specifically, monomers which can be copolymerized with styrene, or for that matter, any vinyl monomer, and which can reversibly complex carbon dioxide are synthesized. Such vinyl polymers are relatively easily synthesized in the laboratory. Moreover, unaminated vinyl polymers such as polystyrene presently account for a large percentage of the foamed polymer market.

While stable under ambient conditions, the $CO_2$ reaction products of the polymers thermally disassociate to form free $CO_2$ at temperatures above approximately 60°–70° C.

Aminated polymers and copolymers can be exposed to $CO_2$ either in bulk or in solution. Aminated polymers are found to react readily with $CO_2$ under a variety of conditions including absorption of $CO_2$ from the air at ambient conditions. The exposure to $CO_2$ results first in swelling, followed quickly by reaction and significant complexing of the $CO_2$ into the material, preferably in the form of zwitterions. Unlike the case of simple swelling of polystyrene by $CO_2$, the stability of these zwitterions at atmospheric pressure and temperature prevents destabilization of the material upon a reduction in pressure to ambient conditions.

Thermal dissociation of the adsorbed $CO_2$ occurs in a clean fashion, resulting in the regeneration of the original aminated copolymer. The binding capacity of the pendant amine groups increases in the order primary>secondary>tertiary following increases in relative basicity.

Because the reaction of an amine and $CO_2$ to produce a carbamic zwitterion and/or an ion/counterion pair is a reversible reaction, and because the amines are locked into the polymer backbone, the present polymers can be reverted to their expandable form simply by collection, washing, granulating, and re-exposure to high pressure $CO_2$.

Further, because the carbon dioxide can be isolated from the atmosphere, the product will be recycling the gas continually, rather than generating new gases. Reversion to the expanded polymer closes the recycling loop for this material, a major goal of plastics recyclers.

Still further the ability in the present invention to accurately vary the amine content of the aminated polymers and thereby the amount of $CO_2$ complexed enables substantial control over foaming and thereby over the physical properties of the foamed product.

Moreover, microporous as well as linear, non-porous amine-functional polymers and copolymers are effective, thermally-reversible sorbents for acid gases including $CO_2$, $NO_x$, $SO_2$ and $H_2S$. These materials may also find potential applications in facilitated transport membrane technology.

DETAILED DESCRIPTION OF THE INVENTION

Results from studies of $CO_2$/amine reactions using free amine indicate: (1) the reactivity of amines towards $CO_2$ appears to increase as the basicity of the amine increases ($pK_b$ decreases) and (2) varying the stoichiometry of the reaction can lead to structurally different products. Regarding the latter point, a 2:1 amine/$CO_2$ ratio is generally thought to produce the ion/counterion product:

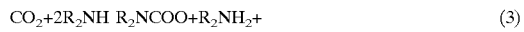

$$CO_2 + 2R_2NH \rightarrow R_2NCOO^- + R_2NH_2^+ \qquad (3)$$

whereas an equimolar ratio is predicted to generate the zwitterion:

$$CO_2 + R_2NH \rightarrow R_2N^+HCOO^- \qquad (4)$$

It is preferable to complex at least one $CO_2$ molecule per amine group in the present polymers, thereby maximizing the number of $CO_2$ molecules available for foaming. It is, therefore, preferable to form the zwitterion.

1. Monomer and Copolymer Synthetic Schemes

Figure 1:
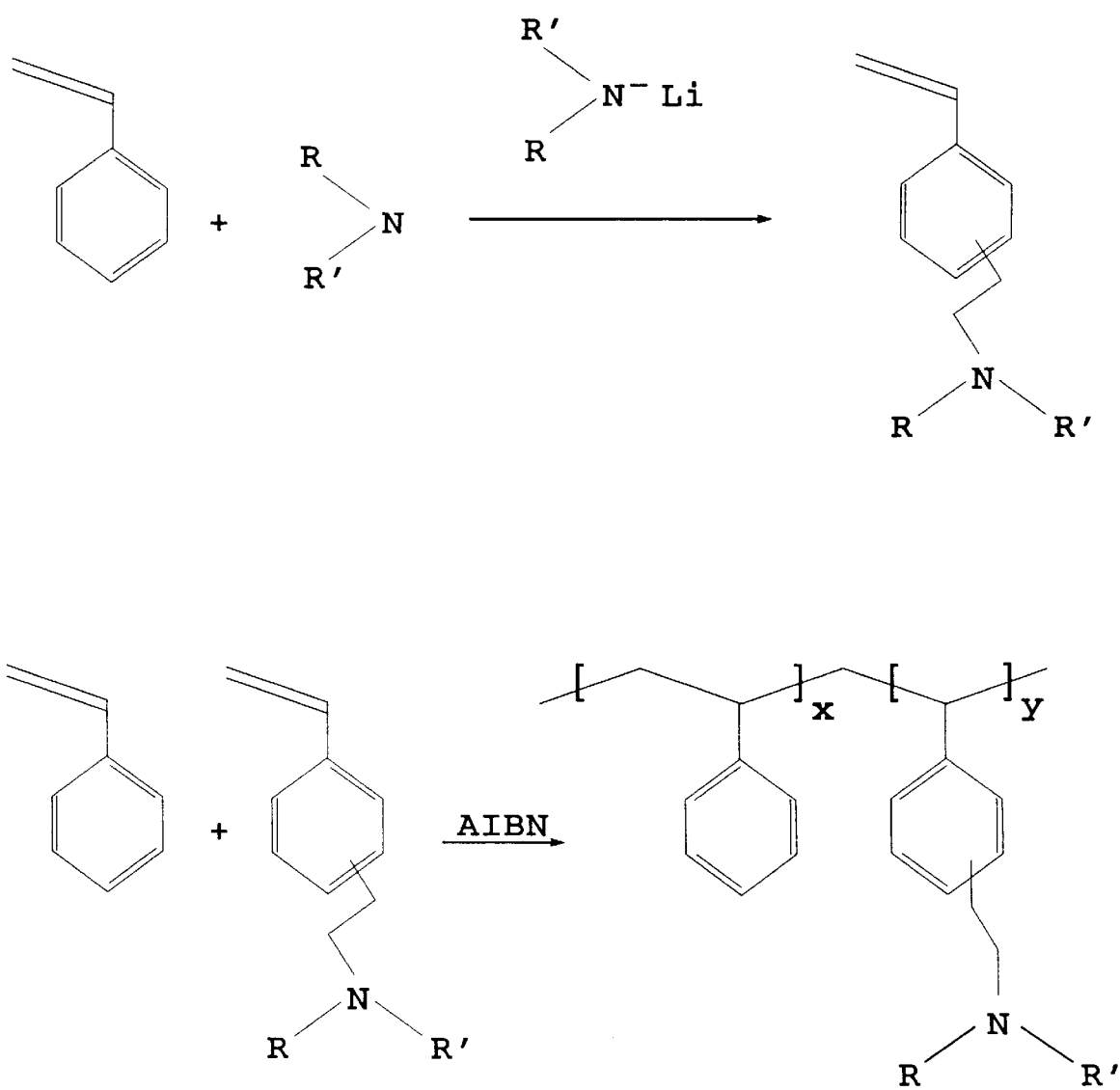
FIG. 1 is an illustration of a Scheme 1 polymer synthesis under the present invention.

Amino-bearing functional groups can be incorporated into a polymer through several synthetic schemes. As depicted in Scheme I of FIG. 1, such functional groups can be incorporated via a copolymerization of a vinyl monomer (e.g., styrene) and a functionalized vinyl comonomer (e.g., functionalized styrene). The functionalized comonomer(s) are readily prepared either by addition of a primary or secondary amine to vinylbenzylchloride (VBC or chloromethyl styrene) (preferably in the presence of a phase transfer catalyst) or by addition of an amine/lithiated amine mixture to divinylbenzene. A drawback to the preparation of functionalized comonomer(s) using divinylbenzene is the difficulty in obtaining sufficiently pure divinylbenzene. Diamines and triamines are preferably used to ensure that an unreacted, pendant amine group remains to complex with $CO_2$. Monoamines have previously reacted with chloromethyl styrene via a nucleophelic substitution of chlorine by N'Guyen, T. D., et al., 19 Polymer 423 (1978) and Tsuruta, T., et al., 177 Chem. 3255 (1976).

Figure 2:
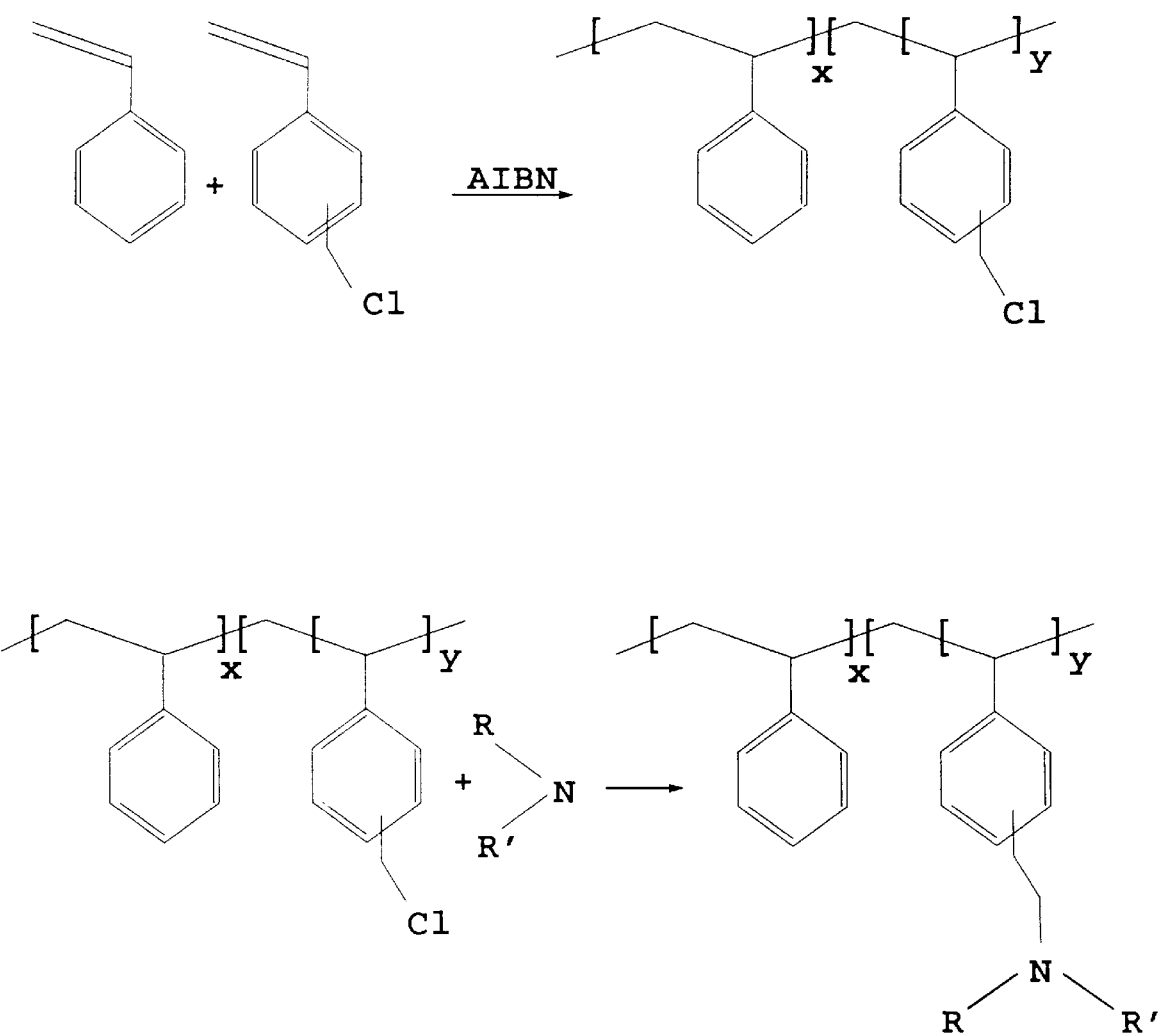
FIG. 2 is an illustration of a Scheme 2 polymer synthesis under the present invention.

Amino-bearing functional groups may also be incorporated by functionalization of a previously prepared S-VBC copolymer (Scheme II as depicted in FIG. 2). N'Guyen and coworkers have shown that monoamines can be incorporated into a S-VBC copolymer. The latter procedure was claimed to ultimately produce a more thermally-stable polymer than that derived from chloromethyl styrene. It has been discovered that amino-functionalized styrene polymers can be readily prepared via the reaction of a poly styrene-co-vinylbenzylchloride or S-VBC with an excess or di- or tri-amine in solution.

In a typical synthetic procedure under Scheme II, styrene and VBC monomers supplied by Aldrich Chemical Company, Inc. are preferably washed with dilute NaOH to remove inhibitor, then vacuum-distilled in the presence of a drying agent and stabilizer. The S-VBC copolymer may be prepared via solution polymerization in toluene under $N_2$. The reaction is allowed to proceed for predetermined period of time, after which time the copolymer is precipitated in a large excess of methanol, washed, then vacuum dried. Amino-functionalized styrene copolymers may be prepared by adding a solution of poly (styrene-co-VBC or S-VBC) in DMF preferably to an excess of diamine or triamine. Excess diamine and/or triamine is preferably used to minimize crosslinking. The reaction is allowed to proceed to completion at room temperature. The product is precipitated in dilute aqueous NaOH, washed, then vacuum dried.

Figure 3:
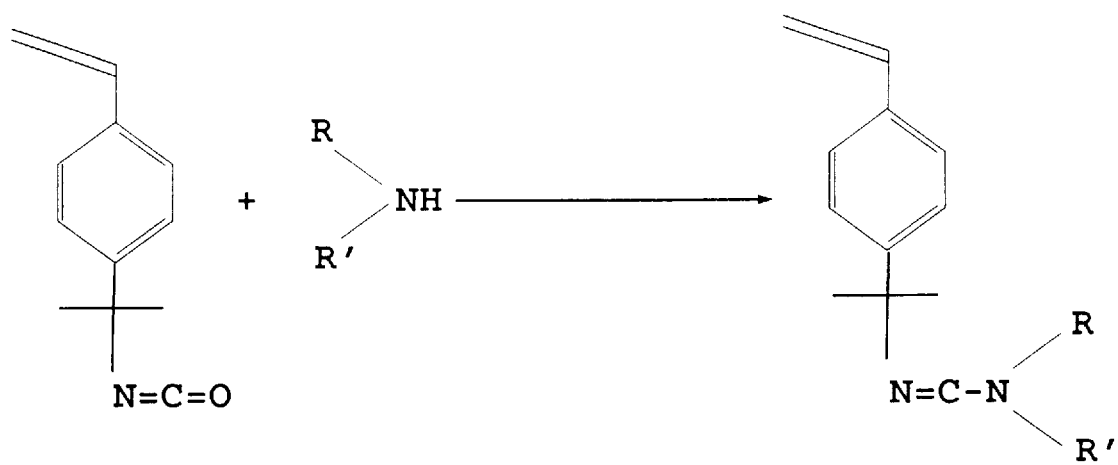
FIG. 3A is an illustration of a Scheme 3 polymer synthesis under the present invention.
FIG. 3B is an illustration of a Scheme 3 polymer synthesis under the present invention.
Figure 3:
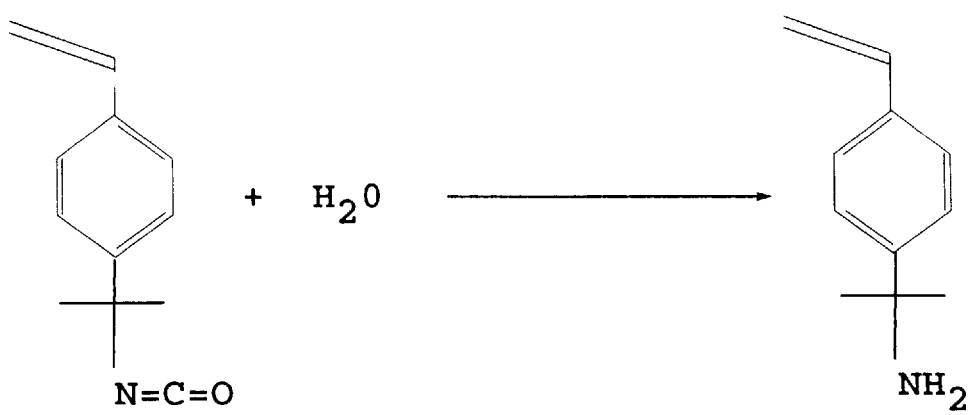

Two additional synthetic schemes, referred to generally as Scheme III, for producing amino-functionalized copolymers are shown in FIGS. 3A and 3B. In FIGS. 3A and 3B, a functionalized comonomer is prepared by the reaction of 1(-isocyanoto-1-methylethyl)-3-(1-methylethenyl)benzene (TMI™) provided by American Cyanamid Company with a primary or secondary amine or with water. The functionalized comonomer may then be copolymerized with styrene or another vinyl monomer.

Also consistent with Scheme III, a copolymer of TMI and styrene or another vinyl monomer can first be synthesized. The resultant copolymer can then be functionalized in a reaction similar to those shown in FIGS. 3A and 3B. In the case of copolymerization of styrene and TMI, the styrene monomer is first washed to remove the inhibitor. TMI is obtained inhibitor-free. The TMI and styrene are copolymerized in toluene at approximately 70° C. under nitrogen using a free radical initiator such as azo bis(isobutyronitrile) (AIBN). After approximately 36 hours, the copolymer is withdrawn for analysis and functionalization. The copolymer/toluene solution is poured into a toluene solution containing an excess of di- or triamine. The mixture is then allowed to react at approximately 50° C. overnight. Subsequently, the polymer is precipitated by adding a large volume of the non-solvent methanol. Following precipitation, the copolymer is washed with methanol and acetone, and then vacuum dried.

Figure 4:
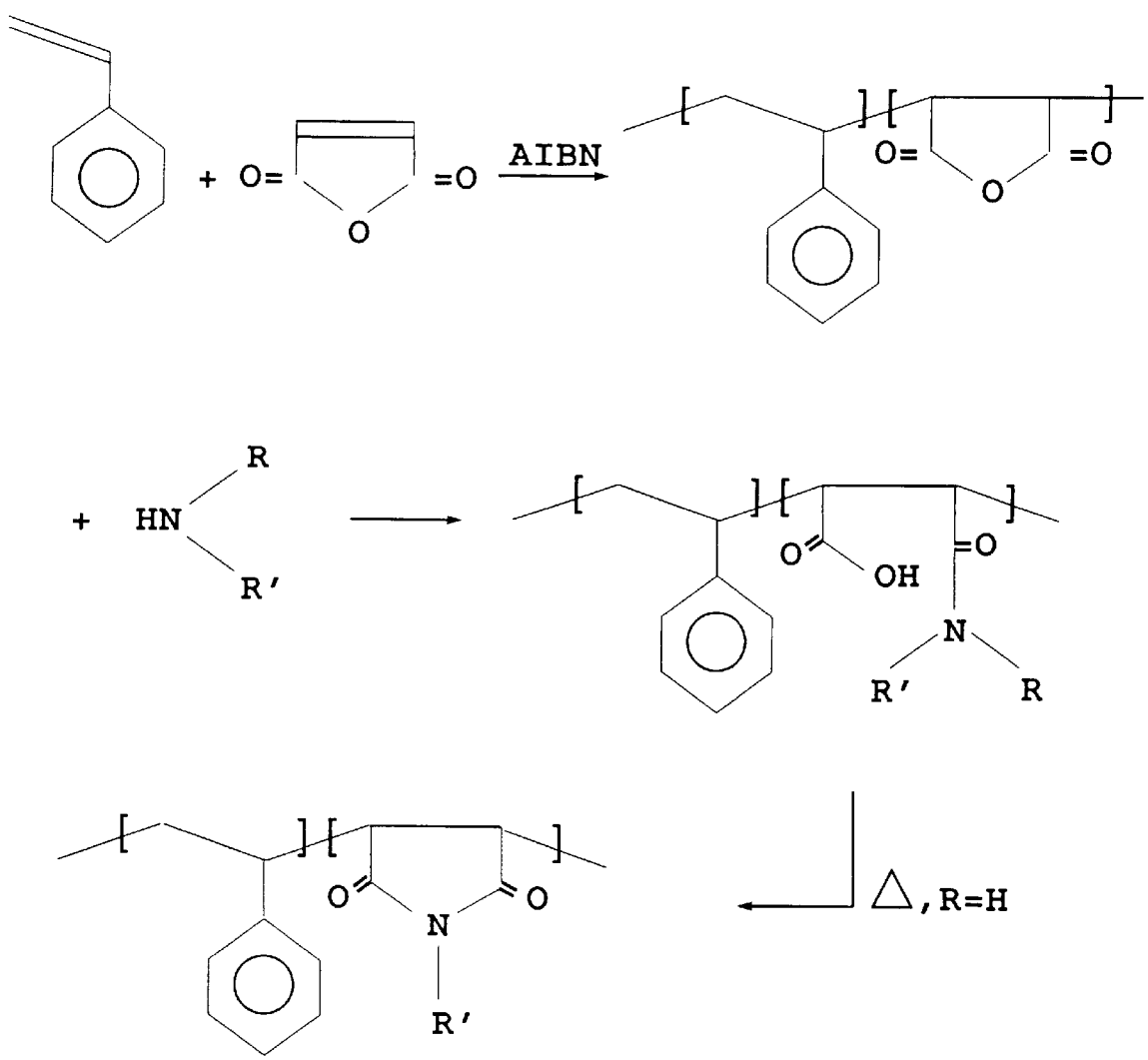
FIG. 4 is an illustration of a Scheme 4 polymer synthesis.

In Scheme IV, depicted in FIG. 4, maleic anhydride is copolymerized with a vinyl monomer in the presence of a free radical initiator such as (AIBN). The copolymer is then functionalized by the addition of a primary or secondary amine.

Finally, it has been demonstrated that certain amino acids, particularly lysine and arginine, effectively complex carbon dioxide. These results suggest the possibility of generation of amino-acid functionalized synthetic polymers which reversibly complex $CO_2$, or the intriguing potential for the design of proteins or polysaccharides which can be used as recyclable and/or degradable, expandable materials.

2. Examples of Copolymer Synthesis

Example A

In a synthetic procedure under Scheme I, an amine functionalized vinyl comonomer was produced by reaction of vinylbenzylchloride (VBC) with ethylenediamine (EDA) in the presence of PolyDMAP™, a polymer-bound dialkylaminopyridine acylation catalyst (Reilly Industries, Inc.). This synthesis consisted of adding dropwise a solution of 10.7 g (70.2 mmols) VBC in 20 ml of dry toluene into a stirred mixture of 21 g (350 mmols) EDA, 5 ml of toluene and 500 mg of polyDMAP. After 30 minutes, the solvent and excess EDA were removed under vacuum. The aminated comonomer was separated from the catalyst by filtration; the yield was approximately 62%. The aminated copolymer was subsequently obtained via a solution free-radical copolymerization. In a typical reaction, 13.6 g (131 mmols) of styrene, 4.9 g (28 mmols) comonomer and 18 mg of AIBN were added to 40 ml of toluene under nitrogen at room temperature. The mixture was stirred at 68° C. for six hours after which the contents were poured into a large volume (300 ml) of methanol to coagulate the polymer. After subsequent filtration and washing with methanol, the product was dried for 24 hours under vacuum.

Example B

In a synthesis under the procedure of Scheme II, S-VBC copolymers were prepared via AIBN-initiated solution copolymerization in toluene at 68° C. Several amines, including piperazine (PIP), 1-methylpiperazine (1-MPIP), cis and trans 1,4-diaminocyclohexane (1,4-DAC), diethylenetriamine (DETA) and ethylenediamine (EDA) have been reacted with styrene-VBC copolymer (1 g, VBC/Styrene= 1:5) in toluene (80 ml). The copolymer solution is dripped slowly into a large excess of amine in 100 ml of toluene. In the presence of an acylation catalyst, the mixture was stirred under nitrogen for several days at 30° C., after which the solvent is removed under vacuum. The product was washed to remove excess amine and dried under vacuum.

Example C

Figure 5:
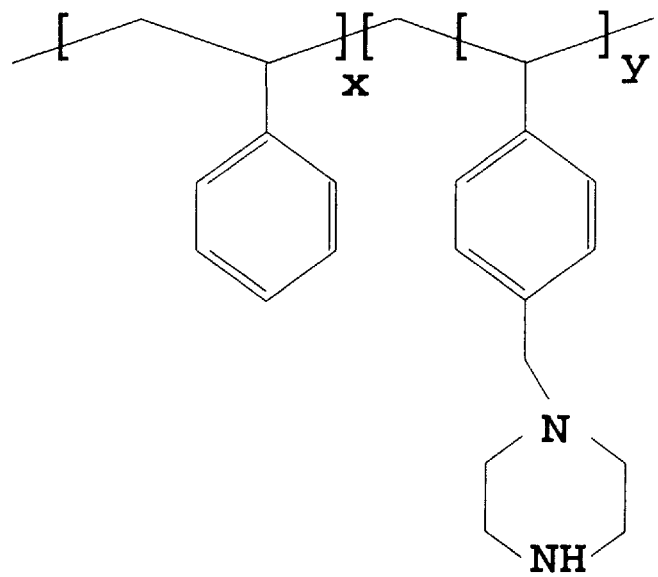
FIG. 5 is an illustration of a copolymer of styrene and piperazine-functionalized styrene.

In another synthesis under Scheme II, a copolymer of styrene and piperazine-functionalized styrene shown in FIG. 5 (monomer/comonomer molar ratio=5:1) was successfully synthesized. This copolymer exhibited a glass transition temperature of approximately 120° C. by DSC, while TGA showed no weight loss up to 300° C. As in the case of the model free amine compounds, the reactivity of the copolymer towards $CO_2$ was gauged by dissolving a sample in chloroform and sparging the solution with $CO_2$. Exposure of the copolymer to $CO_2$ quickly led to formation of a chloroform-insoluble product. A TGA analysis of this $CO_2$ reaction product showed weight loss commencing at leveled out at 8% at approx. 140° C. (scan rate=20° C./min.). Examination of the TGA sampling following cooling clearly showed a cellular structure. Curiously, a weight loss of 8% suggests that this copolymer complexes more than one $CO_2$ molecule per amine group, given that the copolymer showed no signs of degradation following the TGA scan.

Example D

Figure 6:
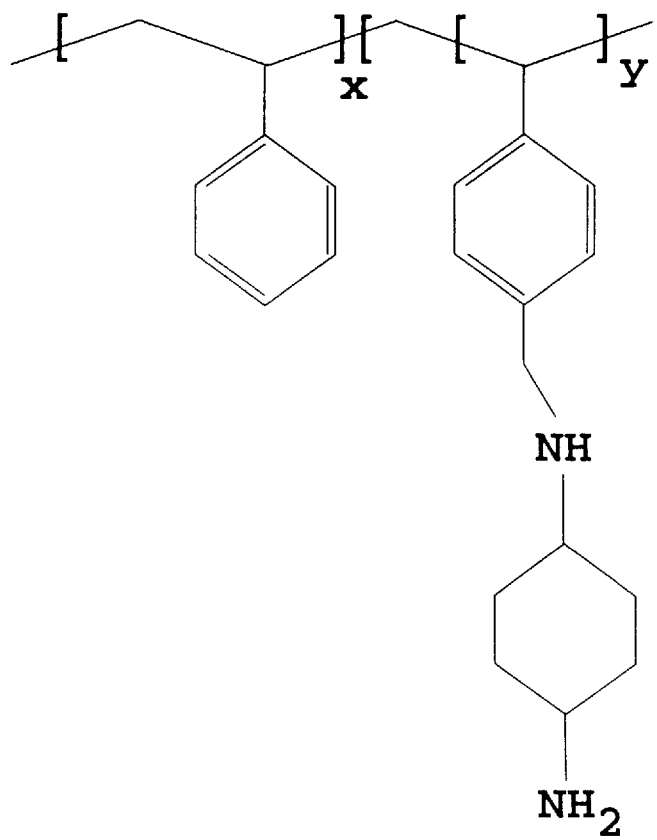
FIG. 6 is an illustration of a copolymer of styrene and hexamethylene diamine.

In another synthesis under Scheme II, a copolymer of styrene and hexamethylene diamine shown in FIG. 6 (monomer/comonomer molar ratio=4:1) has been successfully synthesized. This copolymer exhibited a glass transition temperature of approximately 105° C. by DSC. The polymer was shown to be reversible to its carbon dioxide complexed form by re-exposure to high pressure $CO_2$.

Example E

In still another synthesis under scheme II, several copolymers functionalized with EDA variants were synthesized. Styrene and VBC (70% meta, 30% para) from Aldrich were washed separately with a 0.5% aqueous sodium hydroxide solution to remove the polymerization inhibitors. This process was repeated a minimum of three times. The monomers were then rinsed with distilled water at least six times to substantially eliminate all traces of the sodium hydroxide. Molecular sieves were added to the monomers which were then stored for a minimum of 24 hours in a refrigerator at 4° C. The monomers were then distilled under vacuum prior to polymerization.

The precursor copolymers were made in a toluene (Fisher) solution via free radical polymerization initiated by azo-bisisobutyronitrile (AIBN) (Aldrich). Typically, a 3000 ml, three-neck round bottom flask mounted with a reflux condenser was flushed with nitrogen for 1 hr. The reactor was then charged with 100 ml toluene; 76.6 g (736.5 mmol) styrene; 22.5 g (147.5 mmol) VBC and a solution of 105 mg of AIBN in 10 ml of toluene. The mixture was stirred at room temperature for 30 min while bubbling nitrogen into the reactants. The nitrogen feed was then shut off and the reactor was immersed in an oil bath preheated to 105° C. and the contents stirred overnight. The copolymer was recovered by pouring the solution into a large volume (100 ml) of methanol (Fisher). The precipitate was separated by filtration, redissolved in chloroform (Fisher) and coagulated again in methanol. The product was finally washed several times with small volumes (50 ml) of methanol and dried under vacuum.

The alkylation reactions to produce aminated copolymers were carried out in a toluene solution at 30° C. under nitrogen atmosphere in the presence of polyDMAP. In a typical experiment, 5.259 g of an S-VBC copolymer (with a 30% VBC molar content) were dissolved in 150 ml of toluene. Meanwhile, 8.92 g (149 mmol) of EDA (Aldrich) (i.e., a large excess of EDA to VBC) and 20 ml of tolluene were placed in a 3000 ml, three neck round bottom flask previously flushed with nitrogen as indicated in the preceding paragraph. The copolymer solution was added dropwise into the amine solution while stirring vigorously. The mixture was stirred for 3 days, heated to 90° C. for 4 hrs. then poured into 1500 ml of a 5% aqueous sodium hydroxide solution and stirred at room temperature overnight. To recover the copolymer, the solvent was evaporated under vacuum and the water insoluble fraction of the amino copolymer was separated by filtration, washed thoroughly with distilled water then dried under vacuum. Preparation of materials functionalized with other ethylenediamine variants was also accomplished following these procedures.

3. Copolymer Characterization a. Composition

All polymers were characterized using infrared (IR) and $^{13}C$ NMR. Infra-red spectra were obtained on a Matson FT-IR as KBr pellets. Elemental analysis was performed by Galbraith Labs, Knoxville, TN.

Figure 7:
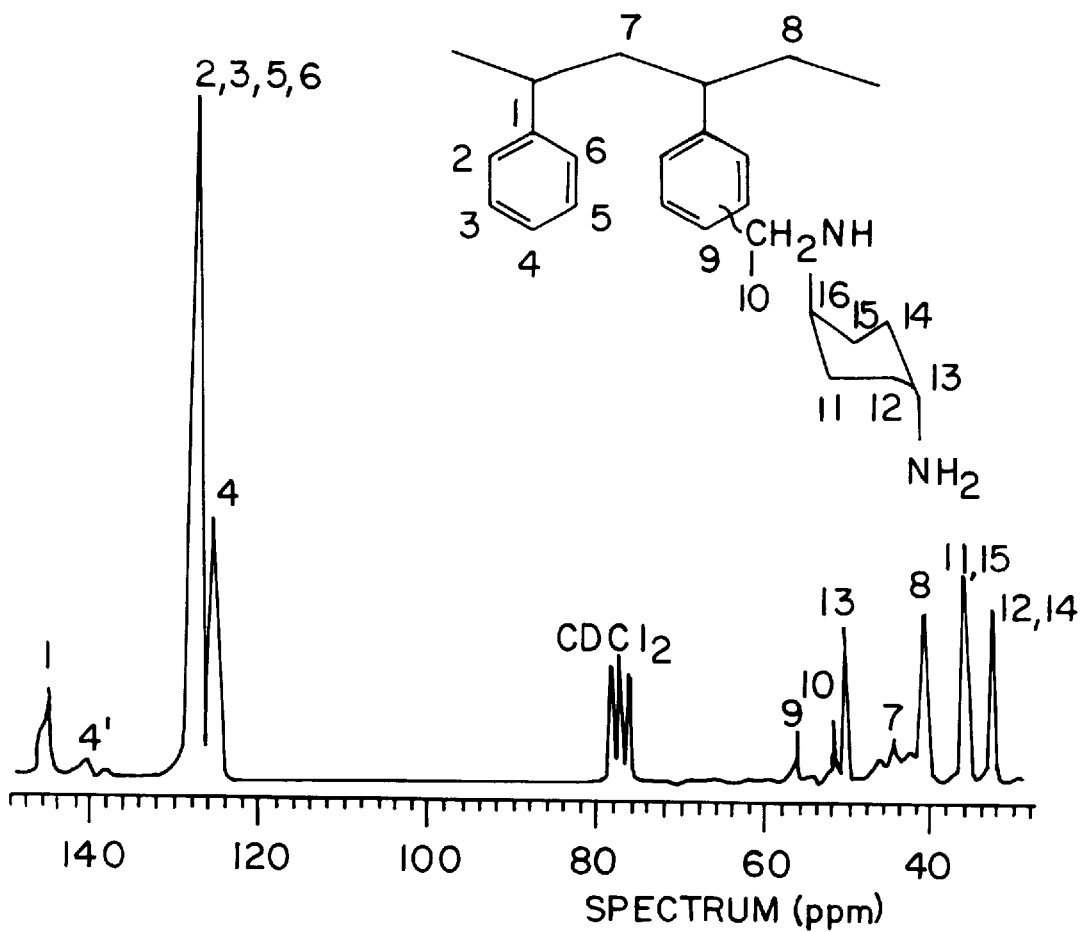
FIG. 7 is a $^{13}C$ NMR spectrum for a copolymer functionalized with 1,4-DAC.

A sample $^{13}C$ NMR spectrum obtained on a BRUCKER 300 MSL instrument using a 10 mm liquid probe and deuterochloroform as solvent is shown in FIG. 7 for the copolymer functionalized with 1,4-DAC as described in Example B. As can be seen, there are apparently no residual unreacted chloromethyl groups, consistent with elemental analysis results. Concerning the Scheme II copolymers of Example B, elemental analysis shows that the VBC/styrene ratio in the precursor copolymer is 1:5. Gel Permeation Chromotography (GPC) shows that the number average molecular weight ($M_n$) is approximately 75,000 and $M_w$ is approximately 128,000. Furthermore, elemental analysis of the aminated copolymers shows that nearly complete substitution of the chloromethyl group has been achieved.

The compositions of the copolymers of Example E were also determined by elemental analysis at Galbraith Laboratories; Knoxville, Tenn., and also via high resolution proton-NMR (Brucker MSL300 instrument with a 5 mm high resolution probe and deuterochloroform as a solvent). In the case of the proton-NMR analysis, copolymer composition is calculated from the relative intensities of the chloromethyl proton signal. Molecular weight and molecular weight distribution were determined by gel permeation chromatography (GPC) using a Waters 150-C instrument with tetrahydrofuran (Aldrich) as the carrier solvent. Weight average molecular weights ($M_w$) and polydispersities were found to range from 98,000 to 130,000 and 2.5 to 3.2 respectively.

The S-VBC copolymer precursors of Example E are predominantly of the random type as deduced from differential scanning calorimetry (DSC) measurements (only one transition was observed) as well as via examination of the reactivity ratios reported in the literature.

Figure 8A:
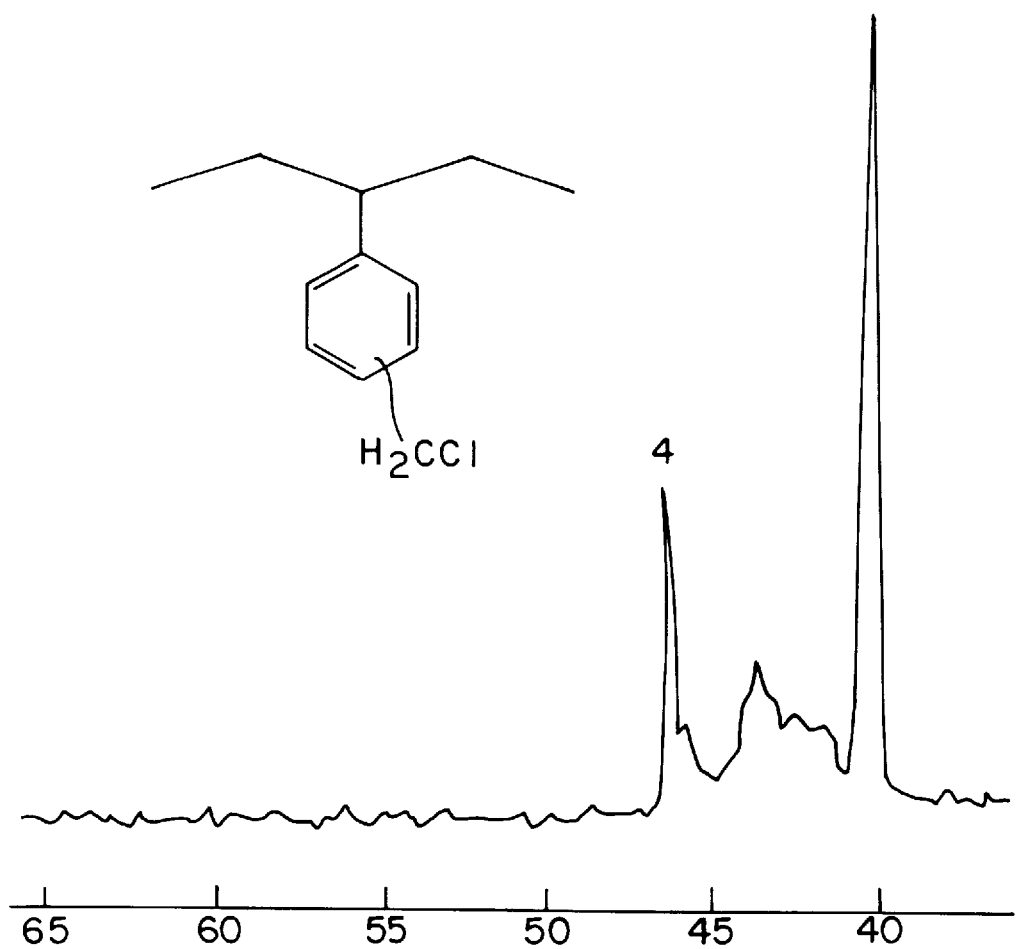
FIG. 8A is an illustration of a $^{13}C$-NMR spectrum of an S-VBC copolymer.
Figure 8B:
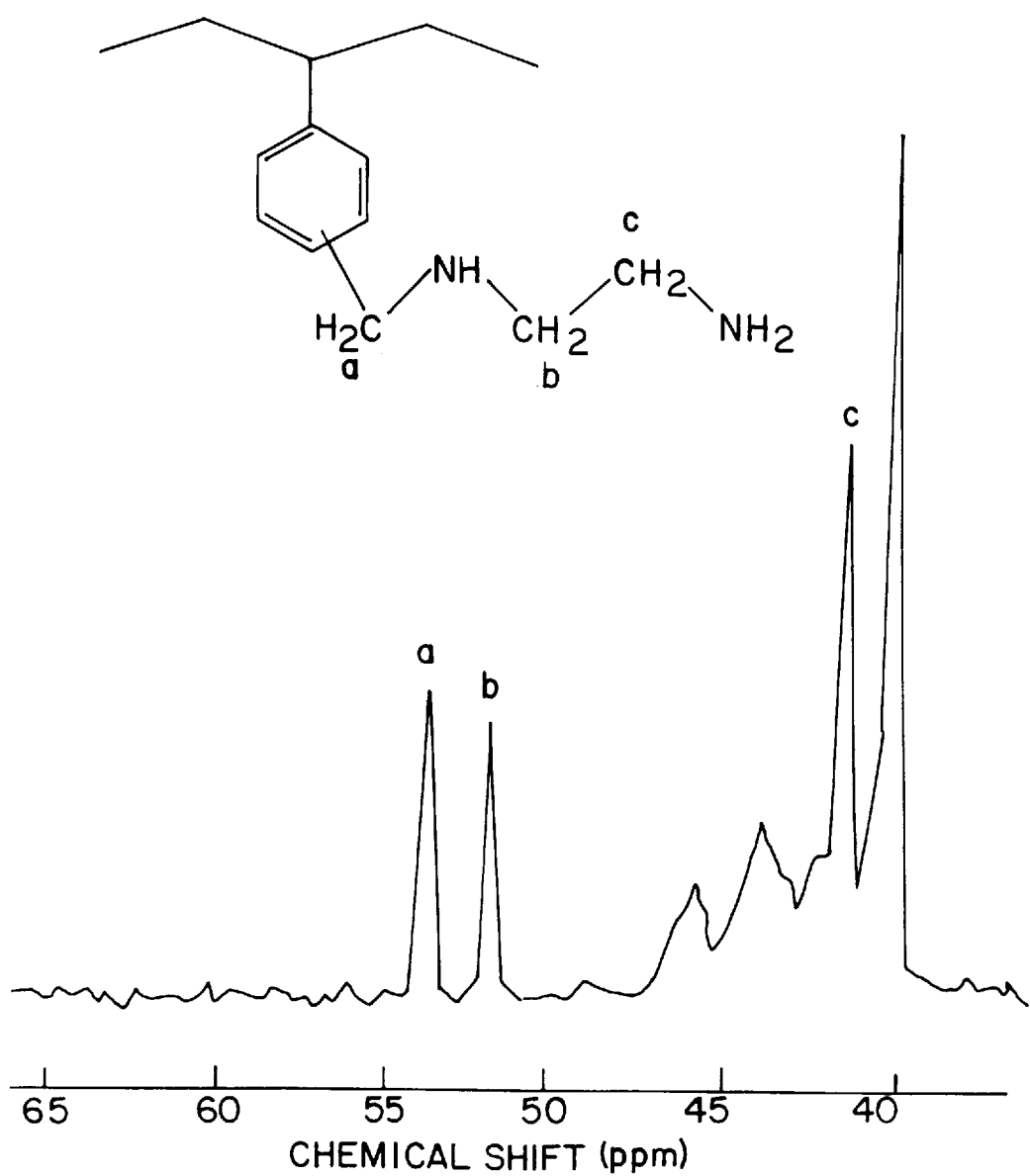
FIG. 8B is an illustration of a $^{13}C$-NMR spectrum of an EDA-functional copolymer.
Figure 9A:
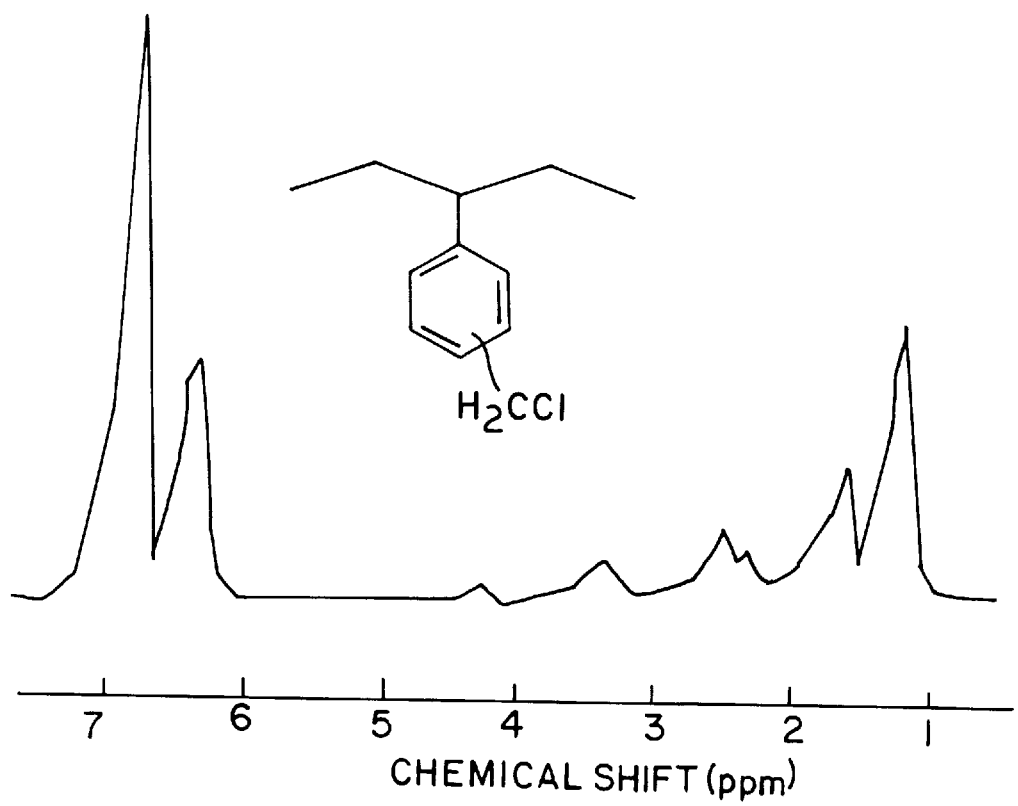
FIG. 9A is an illustration of an $^1H$-NMR spectrum of an S-VBC copolymers.
Figure 9B:
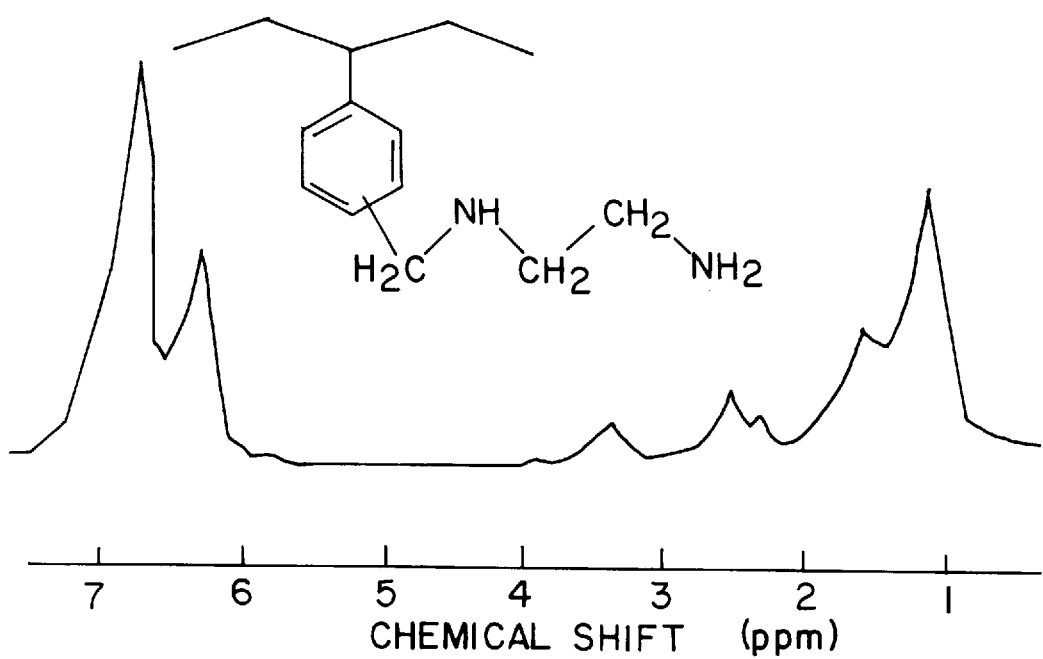
FIG. 9 is an illustration of a $^1H$-NMR spectrum of an EDA-functional copolymer.
Figure 10:
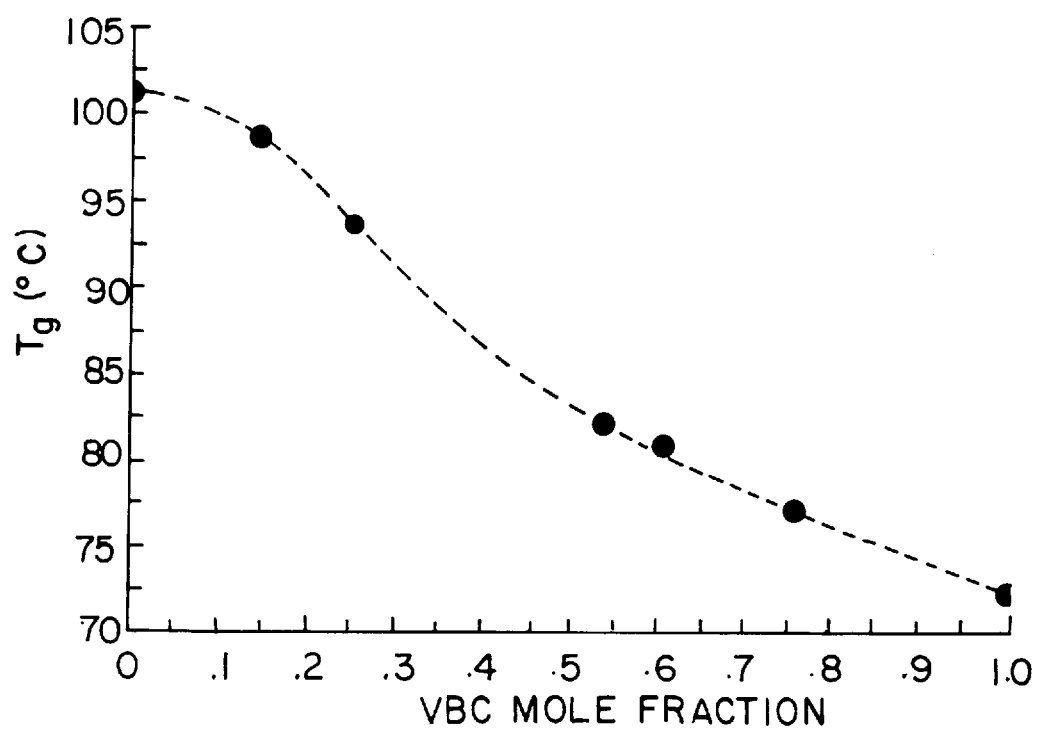
FIG. 10 is an illustration of the glass transition behavior of styrene/vinylbenzylchloride (S-VBC) copolymers as a function of VBC content.

Evidence for the formation of the amino-copolymer is provided by elemental analysis and $^{13}C$-NMR. For example, the spectra shown in FIGS. 8A and 8B indicate that the alkylation reaction is quantitative. The proton-NMR spectra reported in FIGS. 9A and 9B also support this conclusion.

b. Effect of composition upon glass transition temperature:

Incorporation of significant amounts of a comonomer into polystyrene can change the glass transition temperature of the polymer, although the degree of change depends on the side-group structure and concentration. FIG. 10 provides an illustration of the glass transition of S-VBC copolymers as a function of VBC contents, the amino-functionalized copolymers of 4. Reaction of Amino-Functionalized Polymers with $CO_2$ Amine functionalized styrene-based copolymers react readily with carbon dioxide, either in bulk or solution using the following methods:

1. Amine-functionalized copolymers may be exposed to carbon dioxide in bulk at ambient temperature and pressure, at the vapor pressure, or in the vicinity of the critical temperature of carbon dioxide.

2. The animated copolymer may be dissolved in chloroform under ambient conditions. Upon sparging with $CO_2$ a white precipitate quickly appears, indicating the formation of the polymer-bound zwitterion. The product is separated by filtration and dried under vacuum.

The aminated copolymers of Table 1 below were complexed with $CO_2$ via method 1. The stability of the $CO_2$ adduct was analyzed using thermogravimetric analysis (TGA). TGA measurements on the $CO_2$ reaction products of the aminated copolymers as set forth in Table 1 show that the onset of weight loss occurs at temperatures above 60° C. The analysis of the aminated copolymer prior to reaction with carbon dioxide revealed no weight loss up to 275° C. Examination of the TGA samples following completion of the temperature program clearly showed a foamed morphology.

TABLE 1

| Amine | (°C.) | Complete (°C.) | Weight Loss, % |
|---|---|---|---|
| EDA | 62 | 140 | 9.7 |
| 1,4-DAC | 65 | 140 | 4.8 |
| PIP | 78 | 170 | 8.4 |

The amount of carbon dioxide fixed by the animated copolymers of Example E upon exposure to the gas was measured by TGA using a 0.100 ml platinum pan and operated at a heating rate of 10° C./min using a nitrogen gas purge at 50 ml/minute through the balance and furnace compartments.

The chemical composition of the gases evolved upon heating was determined by mass spectroscopy using a Dycor quadruple instrument. After exposing an amino-copolymer in the bulk state to $CO_2$ at its vapor pressure, the product of the reaction was sealed in a vial under a nitrogen atmosphere. Mass spectroscopy data were collected by first sampling the ambient air for 1 minute. Immediately thereafter, the sampling capillary was inserted into the vial and the gases inside the vial were analyzed at ambient temperature for 1 minute. Finally, the vial was immersed in an oil bath preheated to 90° C. and data taken for another 15 minutes. In the course of this experiment, the instrument was set to monitor carbon dioxide, water and nitrogen.

Fourier transform infrared spectroscopy (Mattson Polaris) was used to probe for functional groups present at various stages of the $CO_2$ fix-release cycle. Samples for the FTIR experiments were prepared in the form of thin films cast from a solution of the aminated copolymer in chloroform. FTIR spectra of virgin film and that exposed to liquid $CO_2$ for several hours were recorded. Then the exposed sample was heated to 80° C. for 5 minutes in a vacuum oven and its FTIR spectrum is recorded again.

Figure 11:
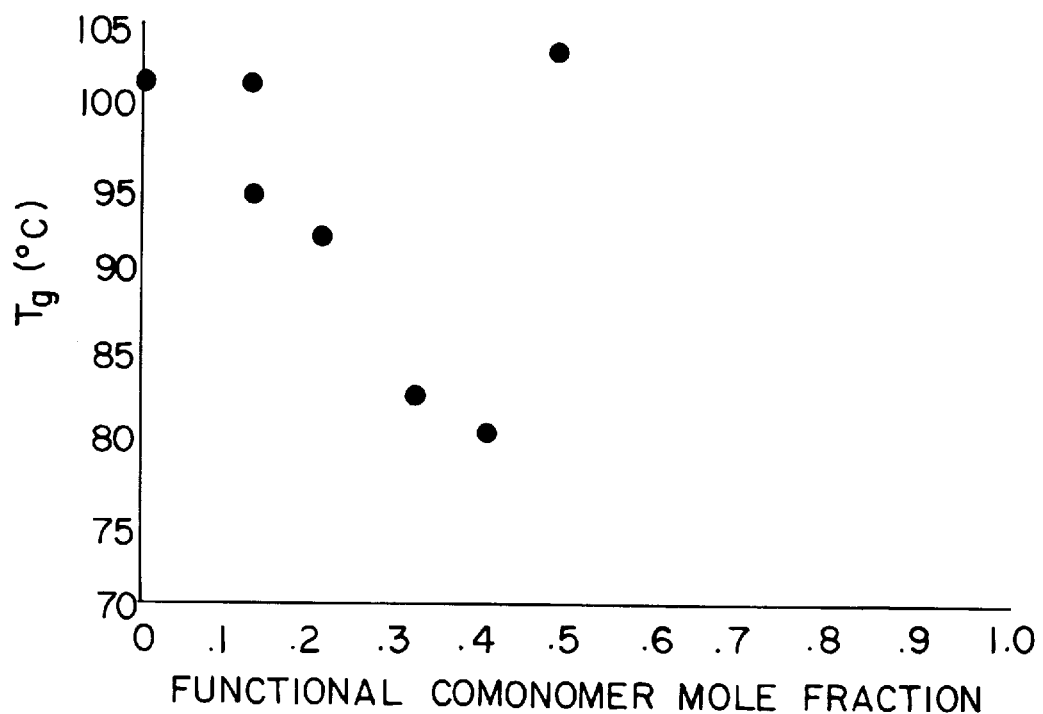
FIG. 11 is an illustration of the glass transition behavior of EDA-functional copolymers.

The glass transition temperatures of the amino-functional copolymers were found to be a function of amino structure as shown in Table 2 and amine content as indicated in FIG. 11.

TABLE 2

Glass Transition Temperatures of Amine-Copolymers as a Function of Structure and Composition

| Amine Type | Structure | Comonomer Mole Fraction | |
|---|---|---|---|
| | | 0.13 | 0.24 |
| EDA | $H_2N(CH_2)_2NH_2$ | 101 | 92 |
| N-MEDA | $HNCH_3(CH_2)_2NH_2$ | 84 | 90 |
| N,N-DMEDA | $H_3C$-$N(CH_2)_2NH_2$-$H_3C$ | 103 | 91 |
| N,N'-DMEDA | $H_3CNH(CH_2)_2NHCH_3$ | 101 | 79 |
| N,N,N'-TMEDA | $H_3C$-$N(CH_2)_2NHCH_3$-$H_3C$ | 97 | 94 |
| TETA | $H_2N(CH_2)_2NH(CH_2)_2NH(CH_2)_2NH_2$ | — | 70 |

As can be seen in FIG. 11 low amounts of EDA-functional comonomer act to plasticize the polymer, lowering $T_g$ from 102° C. (styrene homopolymer) to 80° C. at 40 mole %, further addition of EDA-functional comonomer dramatically increases $T_g$, such that a 50/50 copolymer exhibits a $T_g$ of 103° C., and copolymers with high functional comonomer content (60, 75 and 100%) did not show any thermal transition within the range of −60° to 300° C. These polymers are readily soluble in chloroform/methanol mixtures; thus it is not likely that crosslinking has produced this anomalous $T_g$ behavior. TGA measurements revealed that these materials undergo no weight loss up to 300° C., indicating a thermal stability comparable to that of a styrene homopolymer.

Preferably, therefore, the functional comonomer content is kept below approximately 40%. Most preferably the functional comonomer content is between approximately 20% and 40% (e.g. x:y in FIGS. 1, 2, 4, 5 and 6 preferably is in the range of approximately 4:1 to 3:2).

Figure 12A:
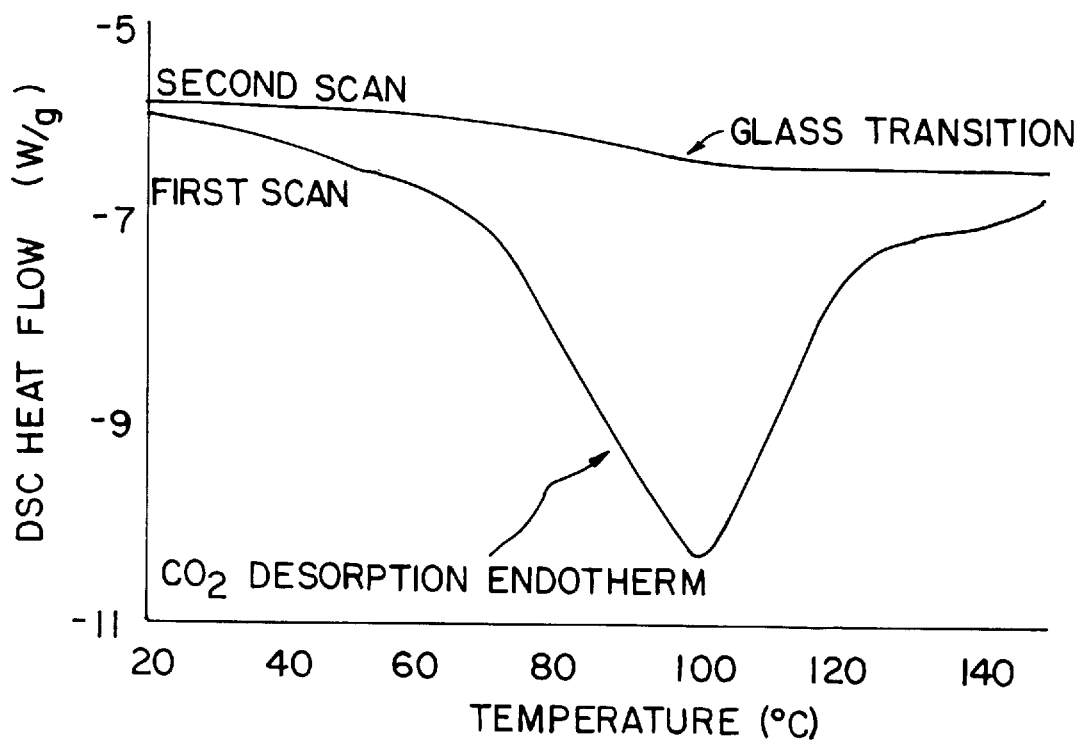
FIG. 12A is an illustration of a DSC scan of $CO_2$ release by EDA-copolymer/$CO_2$ reaction products.
Figure 12B:
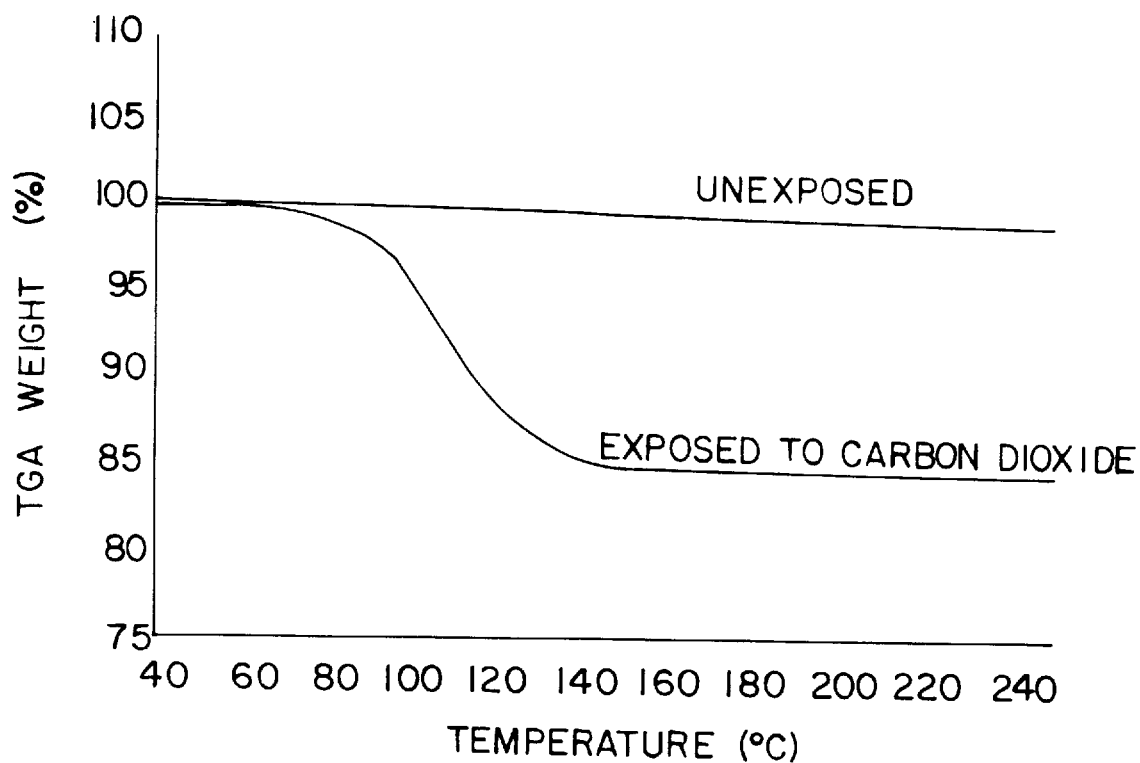
FIG. 12B is an illustration of a TGA scan of $CO_2$ release by EDA-copolymer/$CO_2$ reaction products.
Figure 13:
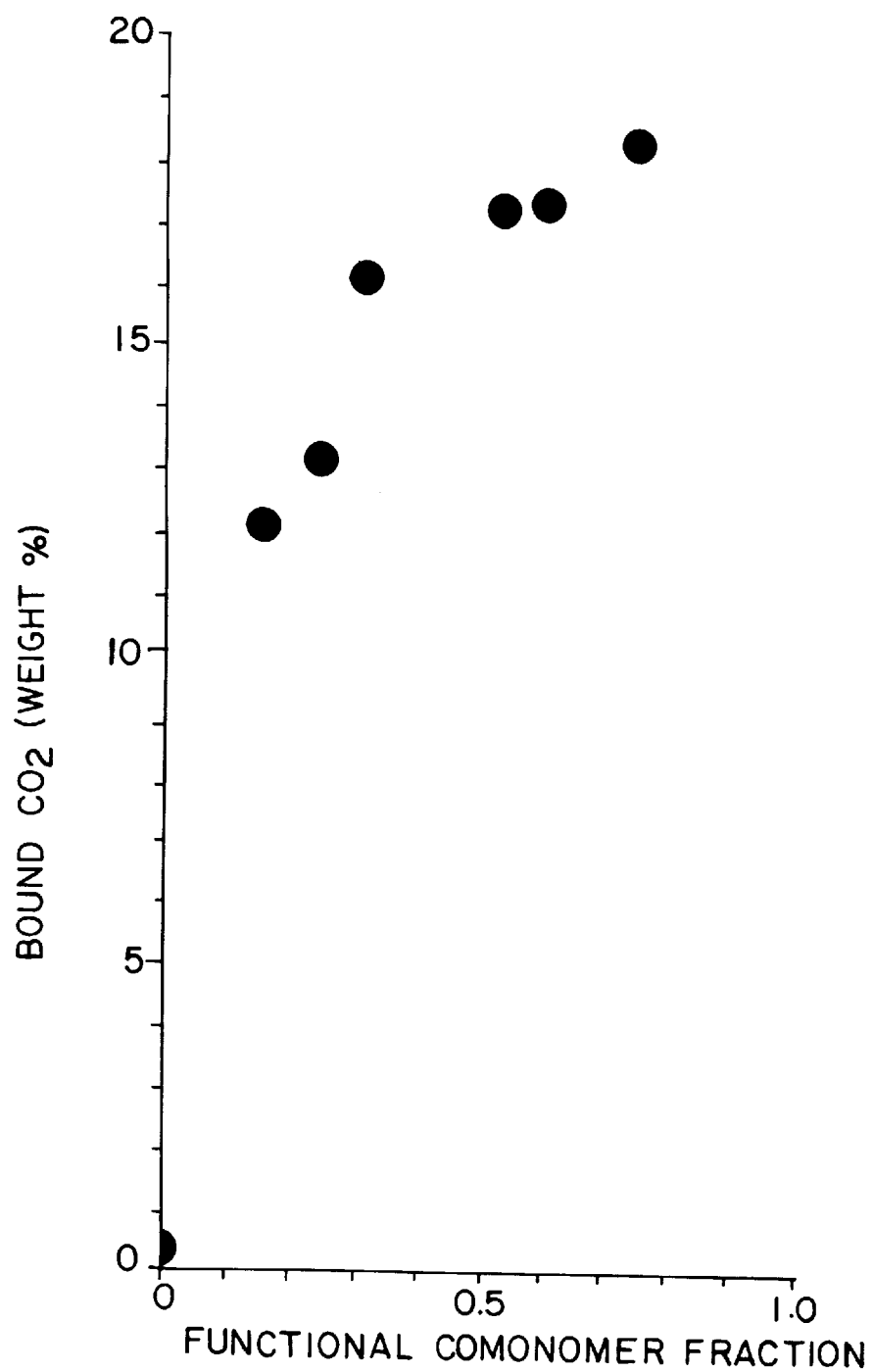
FIG. 13 is a graphical illustration of the $CO_2$ capacity of EDA-functional copolymer as a function of EDA content.

Following exposure to carbon dioxide, the amino-functional polymers of Example E were allowed to age at atmospheric conditions for 24 hours prior to TGA experiments. Typical $CO_2$ desorption curves recorded by DSC and TGA are shown in FIGS. 12A and 12B. As can be seen, the weight loss resulting from $CO_2$ release occurred abruptly and was complete relatively quickly. The non-linear dependency of adsorbed $CO_2$ weight fraction (see FIG. 13) and amine content is believed to be a result of $CO_2$ diffusion limitations, poorer solubility of the copolymer at higher amine loadings and inaccessibility of amine sites entrapped in the bulk of the precipitate during reaction with $CO_2$.

The amount of carbon dioxide bound by these copolymers is a function of amine structure as shown in Table 3.

TABLE 3

$CO_2$ Binding as a Function of Amine Structure and Reaction Conditions

| Amine Type | Bound $CO_2$, Weight % | |
|---|---|---|
| | Method A | Method B |
| EDA | 3.8 | 13 |
| N-MEDA | 1.7 | 5.6 |
| N,N-DMEDA | 1.9 | 4.2 |
| N,N'-DMEDA | 1.0 | 4.0 |
| N,N,N'-TMEDA | 1.1 | 1.8 |
| Polystyrene Homopolymer | <0.1 | |

Method A: Amino-copolymer exposed to liquid $CO_2$ at its vapor pressure
Method B: Amino-copolymer exposed $CO_2$ at 1 atmosphere in chloroform solution The data suggest the following generalizations:

1. Binding capacity of pendant amine groups increases as amine basicity (relative to a Lewis acid such as $CO_2$) increases; i.e., primary>secondary>tertiary.

2. Thermal stability of amine-$CO_2$ adducts appears to increase upon attachment of the amine to the polymer backbone, in that a tertiary amine-functional polymer binds $CO_2$ (albeit a small amount) whereas a low molecular tertiary amine does not.

3. Placement of the amine groups (relative to the phenyl groups) has little or no effect on $CO_2$-binding capacity (compare results for N,N-DMEDA {secondary-tertiary} and N,N'-DMEDA {tertiary-secondary}).

Figure 14:
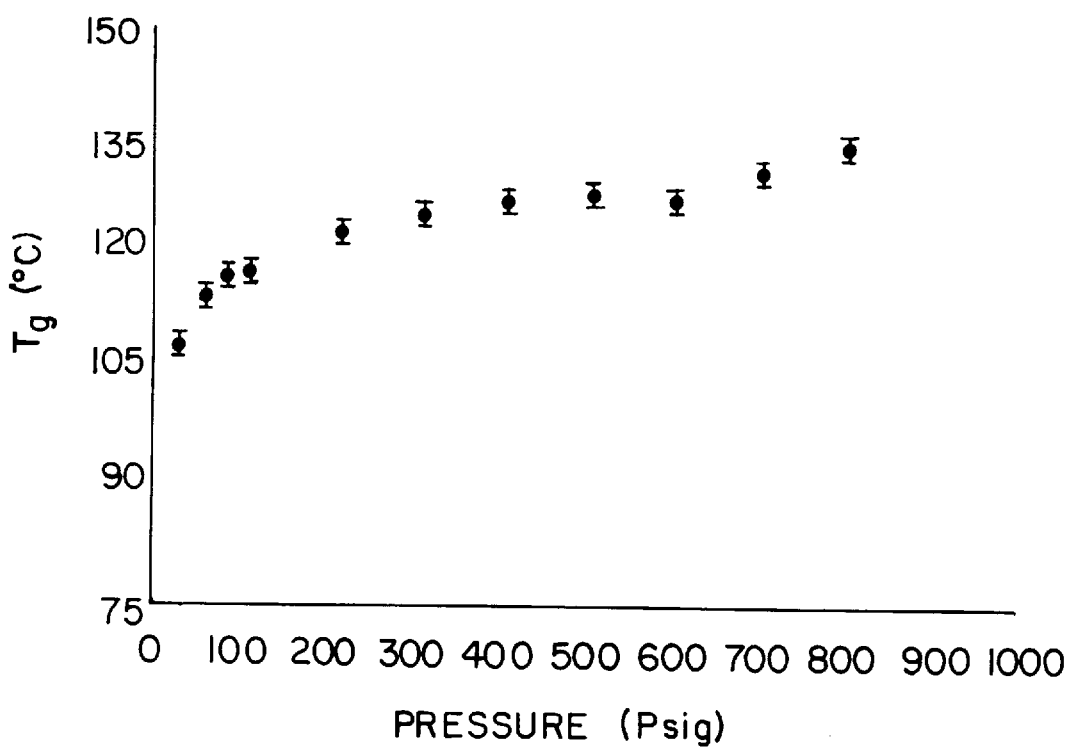
FIG. 14 is a graphical illustration of desorption onset temperature ($T_d$) as a function of pressure.

As shown by the TGA and DSC scans, the onset of catastrophic thermal dissociation occurs at approximately 70° C. and is complete at 160° C. (at ambient pressure). Using a high pressure DSC cell it was observed that the $CO_2$ desorption endotherm is shifted to higher temperatures when the test pressure is increased as shown in FIG. 14. Visual as well as microscopic examination of the sample residues revealed that these products exhibit a foamed structure.

Figure 15:
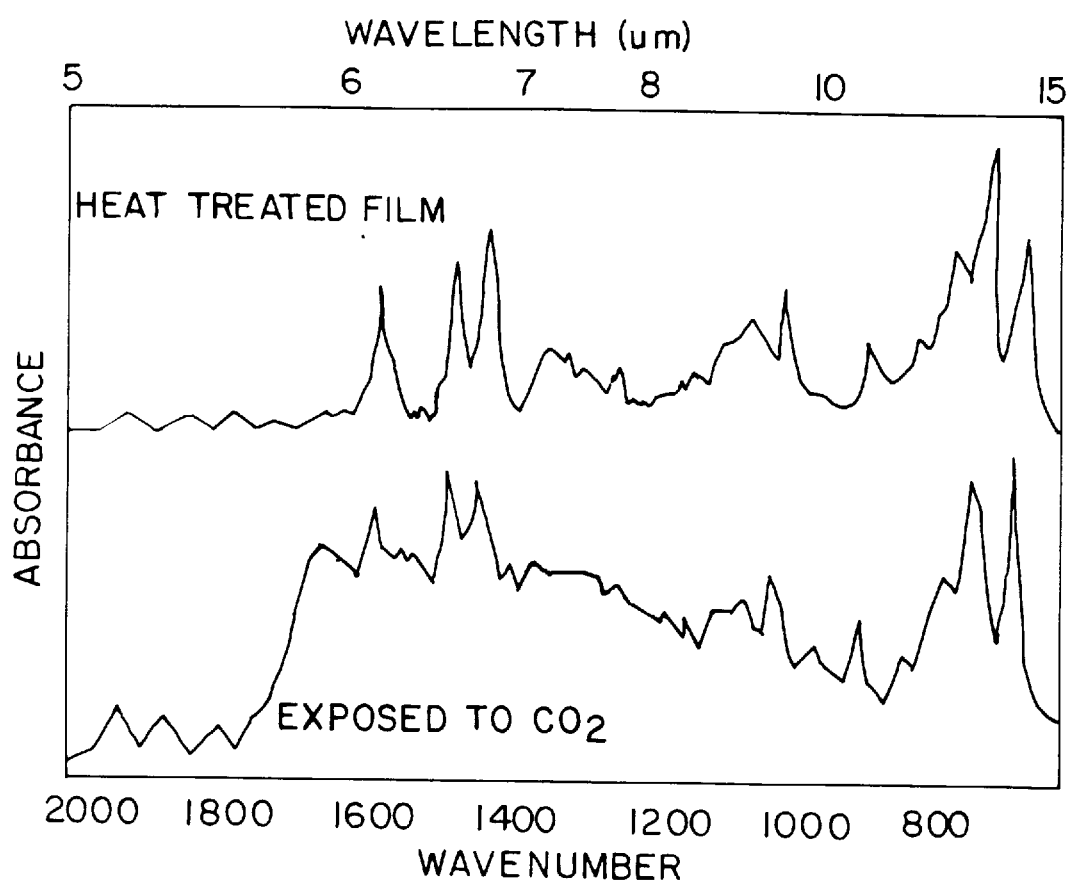
FIG. 15 is an illustration of FTIR spectra of EDA-functional copolymer; the upper curve is for film following $CO_2$ exposure and subsequent heat treatment; the lower curve is for film after $CO_2$ exposure alone.
Figure 16:
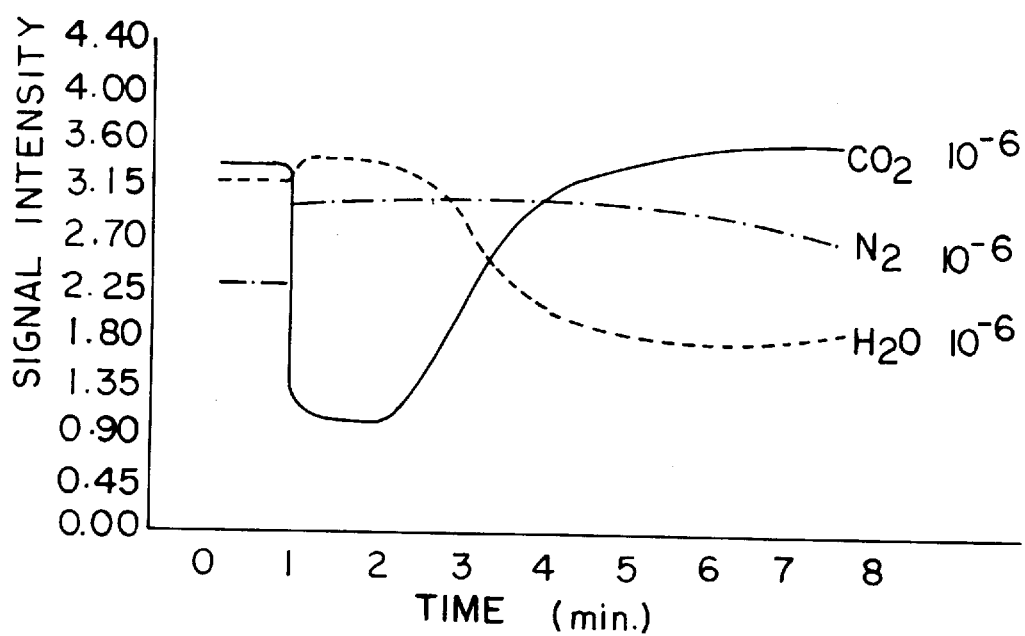
FIG. 16 is an illustration of mass spectroscopy data collected during thermally-initiated release of $CO_2$ from EDA-copolymer/$CO_2$ reaction product.

Mass spectroscopy experiments, in parallel with FTIR spectroscopy, proved to be a useful combination for the characterization of the reaction products and also for the investigation of possible side-reactions (such as the potential for urea formation). Typical spectra (see FIG. 15) do not exhibit absorption bands characteristic of urea functionalities (at 1650 $cm^{-1}$ in the case of diethylurea); suggesting that the decarboxylation step results in a clean regeneration of the original aminated copolymer. Further evidence in support of this observation is provided by the mass spectroscopy data presented in FIG. 16. Upon heating the $CO_2$/EDA-copolymer reaction products, the carbon dioxide signal increased by several orders of magnitude, whereas the water signal remained unchanged throughout the course of the experiment. Also, cyclic reactions of adsorption versus thermally induced desorption of $CO_2$ are fully reproducible, suggesting that the process of reacting the regenerating the amino sites proceeds cleanly.

Although the invention has been described in detail for purposes of illustration, it is to be understood that such detail is solely for that purpose and that variations can be made therein by those skilled in the art without departing from the spirit and scope of the invention except as it may be limited by the claims.

What is claimed is:

1. A reversibly foamed polymer produced by:
   a. exposing an aminated polymer to carbon dioxide under conditions suitable to complex said carbon dioxide with amine groups covalently incorporated into said aminated polymer to produce a carbon dioxide complexed polymer; and b. heating said complexed polymer to a temperature sufficiently high to revert said complexed carbon dioxide to free carbon dioxide, thereby inducing foaming.

2. The foamed polymer of claim 1 wherein said aminated polymer is exposed to carbon dioxide by bubbling the carbon dioxide through a solvent in which said aminated polymer has been dissolved.

3. The foamed polymer of claim 1 wherein said aminated polymer is exposed to carbon dioxide in bulk.

4. The foamed polymer of claim 3 wherein said aminated polymer is exposed to carbon dioxide at a temperature in the vicinity of the critical temperature of carbon dioxide.

5. The foamed polymer of claim 1 wherein said aminated polymer comprises pendant amine groups.

6. The foamed polymer of claim 5 wherein said aminated polymer has a weight average molecular weight in the range of approximately 25,000 to approximately 1,000,000.

7. The foamed polymer of claim 6 wherein said aminated polymer has a weight average molecular weight in the range of approximately 75,000 to approximately 1,000,000.

8. The foamed polymer of claim 7 wherein said aminated polymer has a weight average molecular weight in the range of approximately 100,000 to approximately 1,000,000.

9. The foamed polymer of claim 5 wherein said pendant amine groups are selected from the group consisting of diamines and triamines.

10. The foamed polymer of claim 5 wherein said pendant amine groups are selected from the group consisting of primary and secondary amines.

11. The foamed polymer of claim 9 wherein said amines groups are selected from the group consisting of primary and secondary amines.

12. The foamed polymer of claim 5 wherein said aminated polymer comprises a copolymer of styrene and an amine functional vinylbenzyl moiety.

13. The foamed polymer of claim 12 wherein said aminated polymer has the formula

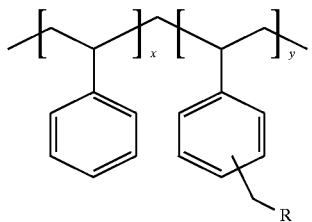

wherein R is an amine moiety and and x and y are at a ratio of x:y in a range of about 4:1 to about 3:2.

14. The foamed polymer of claim 13

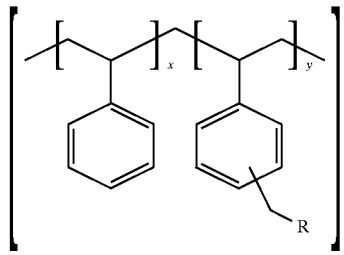

wherein said amine moeity is selected from the group comprising diamines and triamines.

15. The foamed polymer of claim 13

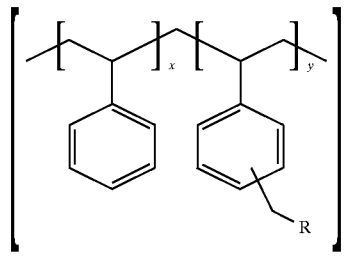

wherein said amine moeity is selected from the group consisting of piperazine (PIP), 1-methylpiperazine (1-MPIP), cis and trans 1,4-diaminocyclohexane (1,4-DAC), diethylenetriamine (DETA), TETA, hexamethylene diamine, ethylenediamine (EDA), N-MEDA, N,N-DMEDA, N,N'-DMEDA, N,N,N'-TMEDA, diamine p-menthane adamantanediamine, N,N'-diethyl-2-butene-1,4-diamine, N-cyclohexyl-1,3-propanediamine and 3,3'-diamino-N-methyldipropylamine.

16. The foamed polymer of claim 5 wherein said amine groups have a $PK_a$ greater than approximately 8.0.

17. The foamed polymer of claim 13

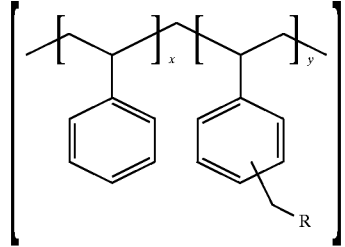

wherein said amine moiety has a $pK_a$ greater than approximately 8.0.

18. The foamed polymer of claim 1 wherein said aminated polymer comprises sufficient amine groups to complex between approximately 1 to 33 weight percent carbon dioxide based upon a weight of uncomplexed, aminated polymer.

19. The foamed polymer of claim 1 wherein said aminated polymer comprises sufficient amine groups to complex between approximately 4 to 33 weight percent carbon dioxide based upon a weight of uncomplexed, aminated polymer.

20. The foamed polymer of claim 1 wherein said aminated polymer comprises sufficient amine groups to complex between approximately 4 to 20 weight percent carbon dioxide based upon a weight uncomplexed, aminated polymer.

21. The foamed polymer of claim 1 wherein said aminated polymer comprises sufficient amine groups to complex between approximately 5 to 20 weight percent carbon dioxide based upon a weight of uncomplexed, aminated polymer.

22. A method of producing a reversibly foamed polymer comprising the steps of:

a. exposing an aminated polymer to carbon dioxide under conditions suitable to complex said carbon dioxide with amine groups covalently incorporated into said aminated polymer; and b. heating said complexed polymer to a temperature sufficiently high to revert complexed carbon dioxide to free carbon dioxide, thereby inducing foaming.

23. The method of claim 22 wherein the step of exposing said aminated polymer to carbon dioxide comprises the step of bubbling carbon dioxide through a solvent in which said polymer has been dissolved.

24. The method of claim 23 wherein said solvent is chosen so that said complexed polymer is insoluble in said solvent, thereby resulting in precipitation of complexed polymer product.

25. The method of claim 22 wherein said aminated polymer is exposed to carbon dioxide in bulk form.

26. The method of claim 25 wherein the temperature is kept in the vicinity of the critical temperature of carbon dioxide.

27. The method of claim 22 wherein said aminated polymer comprises pendant amine groups.

28. The method of claim 27 wherein said aminated polymer has a weight average molecular weight in the range of approximately 25,000 to approximately 1,000,000.

29. The method of claim 28 wherein said aminated polymer has a weight average molecular weight in the range of approximately 75,000 to approximately 1,000,000.

30. The method of claim 29 wherein said aminated polymer has a weight average molecular weight in the range of approximately 100,000 to approximately 1,000,000.

31. The method of claim 27 wherein said pendant amine groups are selected from the group consisting of diamines and triamines.

32. The method of claim 27 wherein said pendant amine groups are selected from the group consisting of primary and secondary amines.

33. The method of claim 31 wherein said amines groups are selected from the group consisting of primary and secondary amines.

34. The method of claim 27 wherein said aminated polymer comprises a copolymer of styrene and an amine functional vinylbenzyl moiety.

35. The method of claim 34 wherein said aminated polymer has the formula

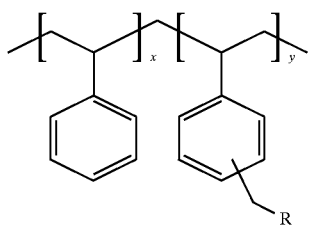

wherein R is an amine moeity and x and y are at a ratio of x:y in a range of about 4:1 to about 3:2.

36. The method of claim 35

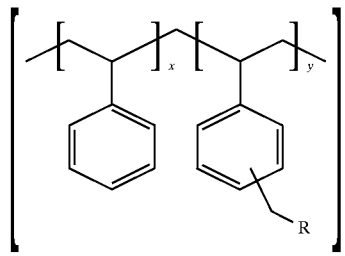

wherein said amine moiety is selected from the group comprising diamines and triamines.

37. The method of claim 35

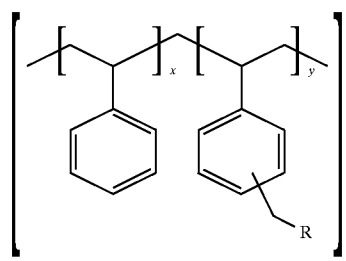

wherein said amine moiety is selected from the group consisting of piperazine (PIP), 1-methylpiperazine (1-MPIP), cis and trans 1,4-diaminocyclohexane (1,4-DAC), diethylenetriamine (DETA), TETA, hexamethylene diamine, ethylenediamene (EDA), N-MEDA, N,N-DMEDA, N,N'-DMEDA, N,N, N'-TMEDA, and diamine p-methane.

38. The method of claim 22 wherein said amine groups have a $pK_a$ greater than approximately 8.0.

39. The method of claim 35

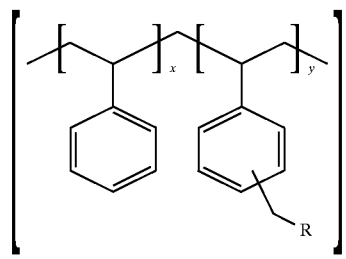

wherein R has a $pK_a$ greater than approximately 8.0.

40. The method of claim 22 wherein said aminated polymer comprises sufficient amine groups to complex between approximately 1 to 33 weight percent carbon dioxide based upon the weighed uncomplexed, aminated polymer.

41. The method of claim 22 wherein said aminated polymer comprises sufficient amine groups to complex between approximately 4 to 33 weight percent carbon dioxide based upon the weighed uncomplexed, aminated polymer.

42. The method of claim 22 wherein said aminated polymer comprises sufficient amine groups to complex between approximately 4 to 20 weight percent carbon dioxide based upon the weighed uncomplexed, aminated polymer.

43. The method of claim 22 wherein said aminated polymer comprises sufficient amine groups to complex between approximately 5 to 15 weight percent carbon dioxide based upon the weighed uncomplexed, aminated polymer.

44. A polymer having a pendant amino group capable of reversibly incorporating carbon dioxide in the form selected from the group consisting of

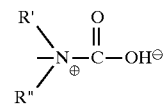

as a carbamic Zwitterion and

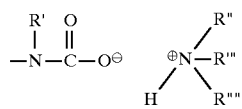

as an ion/counterion pair, wherein said polymer has a weight average molecular wt above 25,000 and R',R'',R''' and R'''' are any alkyl or aromatic functional group, said polymer incorporating sufficient carbon dioxide to induce a desired degree of foaming upon heating said polymer to temperature sufficiently high to thermally dissociate carbon dioxide, thereby producing an uncomplexed, foamed polymer that is suitable to recomplex carbon dioxide for the purpose of recycling.

45. The polymer of claim 44, wherein said polymer has a weight average molecular weight in the range of approximately 25,000 to approximately 1,000,000.

46. The polymer of claim 45 wherein said polymer has a weight average molecular weight in the range of approximately 75,000 to approximately 1,000,000.

47. The polymer of claim 46 wherein said polymer has a weight average molecular weight in the range of approximately 100,000 to approximately 1,000,000.

48. The polymer of claim 44 wherein carbon dioxide is complexed to said pendant amine groups.

49. The polymer of claim 48 wherein said pendant amine groups are selected from the group consisting of diamines and triamines.

50. The polymer of claim 48 wherein said pendant amine groups are selected from the group consisting of primary and secondary amines.

51. The polymer of claim 49 wherein said amines groups are selected from the group consisting of primary and secondary amines.

52. The polymer of claim 44 wherein said polymer is a copolymer of styrene and an amine functional vinylbenzyl moiety.

53. The polymer of claim 52 wherein said polymer has the formula

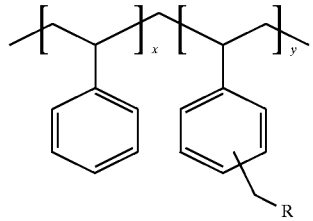

and x and y are at a ratio of x:y in a range of about 4.1 to about 3:2.

54. The aminated polymer of claim 53 wherein R' is an amine moiety.

55. The aminated polymer of claim 44 incorporating complexed carbon dioxide in an amount in the range of 1 to 33 weight percent.

56. The aminated polymer of claim 44 incorporating complexed carbon dioxide in an amount in the range of 4 to 33 weight percent.

57. The aminated polymer of claim 44 incorporating complexed carbon dioxide in an amount in the range of 4 to 20 weight percent.

58. The aminated polymer of claim 44 incorporating complexed carbon dioxide in an amount in the range of 5 to 20.

59. The foamed polymer of claim 1 wherein said aminated polymer comprises recycled aminated polymer previously use to create a foamed product.

60. The method of claim 22 wherein steps (a) and (b) are repeated to recycle an aminated polymer previously used to create a foamed product.

* * * * *